United States Patent [19]

Simonton

[11] 4,417,390
[45] Nov. 29, 1983

[54] BATTERY PLATE WRAPPER MACHINE

[75] Inventor: Robert D. Simonton, Fremont, Ohio

[73] Assignee: Mac Engineering and Equipment Co., Inc., Benton Harbor, Mich.

[21] Appl. No.: 815,814

[22] Filed: Jul. 15, 1977

[51] Int. Cl.³ .............................................. H01M 2/14
[52] U.S. Cl. .................................... 29/730; 29/623.1; 29/623.4; 156/213; 156/485
[58] Field of Search ...................... 29/730, 623.1, 623.4; 429/136, 139; 156/213, 217, 483–485

[56] References Cited

U.S. PATENT DOCUMENTS

| | | | |
|---|---|---|---|
| 2,786,089 | 3/1957 | Pucher | 429/136 X |
| 3,251,723 | 5/1966 | McAlpine et al. | 156/292 |
| 3,514,331 | 5/1970 | Cupp et al. | 429/136 |
| 3,783,585 | 1/1974 | Hoyland | 156/484 X |
| 3,900,341 | 8/1975 | Shoichiro et al. | 429/139 |
| 4,026,000 | 5/1977 | Anderson | 29/730 |
| 4,063,978 | 12/1977 | Badger et al. | 156/213 X |
| 4,080,732 | 3/1978 | Eberle | 29/730 |

Primary Examiner—Carl E. Hall
Attorney, Agent, or Firm—Michael, Best & Friedrich

[57] ABSTRACT

The invention relates to improvements in machines employed for enclosing battery plates within a pouch of sheet material. The sheet is positioned so that the center of its length is disposed between the side of a fixture adapted to receive adjacent thereto the bottom edge of a battery plate and a slot and the sheet is enfolded around the battery plate by moving the fixture plate combination horizontally into and through the slot. As the wrapped bottom edge of the plate emerges from the slot, grasping means are engaged with the wrapped end of the battery plate and hold the plastic sheet tightly so as to prevent any displacement relative to the enclosed battery plate. The fixture is then withdrawn from the enfolding sheet. The overlapping lateral edges of the sheet are then sealed and the battery plate is dropped into an inclined position on an intermittently moving horizontal conveyor to produce a horizontal stack of wrapped plates.

16 Claims, 3 Drawing Figures

BATTERY PLATE WRAPPER MACHINE

BACKGROUND OF THE INVENTION

Machines have heretofore been developed and utilized for wrapping battery plates in a web of material and then sealing the two opposed overlapping edges of the material to form an enclosing pouch open at the top end of the battery plate. See for example the disclosures of U.S. Pat. No. 3,900,341 to Schoichiro and the disclosure of application Ser. No. 475,480 filed June 6, 1974 by the instant inventor and John P. Badger, now U.S. Pat. No. 4,063,978.

These machines achieved a folding of the web around the battery plate by suspending a length of the web in front of a slot and then passing the battery plate horizontally through said slot to effect the wrapping of the web around the battery plate. As the wrapped plate emerged from the slot, however, prior art machines employed either continuously moving belts or rollers to engage the wrapped plate and pull it the remainder of the way through the slot and also hold the web material in position during the edge sealing operation. This type of mechanism for advancing the wrapped plate through the sealing operation proved to be inefficient for several reasons. In the first place, as is well known in the art, a battery plate is a relatively non-uniform article and may not have its bottom edge normal to its lateral sides. Further, a plate is normally provided with a plurality of integral ribs. Advance of the plate bottom against the web may misalign the plate with respect to its enfolding sheet. In addition it is difficult for belt or roller type conveying mechanisms to achieve a firm, non-slipping engagement of the web relative to the enclosed battery plate. Where heat seals are applied to thermoplastic enveloping material advanced as a plate envelope, the application of heat to the thermoplastic material may result in some distortion of the material due to the fact that any thermoplastic plastic material produced in sheet form normally has some degree of orientation incorporated in the material as an inherent result of the sheet forming process. The application of heat to effect the sealing operation results in a tendency of the plastic material to shrink and crinkle and this distorts the position of the plastic material relative to the battery plate or, even worse, effects a displacement between the normally overlapping edges of the plastic material which are to be heat sealed together. As a result, the pouches produced by the prior art machines have not been characterized by a high degree of uniformity and, in some instances, defective pouches have resulted due to the fact that the material is sufficiently displaced or skewed relative to the enclosed battery plate so that it is impossible to achieve contact between and a bond along the entire length of the overlapped edges of the material.

Another deficiency of prior art machines, where the sheet material was fed as a continuous web, lies in the fact that the web was not maintained under strict control during the entire period that it was being inserted into the slot and wrapped around the battery plate. For example, the web in the abovementioned prior patent application was severed before the battery plate had progressed any substantial distance into the web folding aperture slot and in effect, the battery plate caught the plastic material on the fly and forced it into the folding slot. This often resulted in inaccuracies in the length of the folded material relative to the enclosed battery plate. One side of the pouch would be higher or lower than the other side.

Accordingly, it is an object of this invention to improve machines for enclosing battery plates within a pouch formed from a sheet of material.

Another object is to maintain registry of a battery plate with a sheet during the formation of the sheet into an enclosing pouch.

A further object is to accurately establish lengths of sheet derived from a continuous web and to position the sheet lengths for precise folding into battery plate receiving pouches.

A fourth object of this invention is to provide an improved plate wrapping machine wherein the web of thermoplastic material to be wrapped around the battery plate is maintained under control at all points in the cycle of operation so that the web is accurately positioned relative to the battery plate and maintained in such accurate relationship as the wrapping operation progresses.

A particular object of this invention is to maintain a plate centered in the web of sheet material in which it is to be enveloped to cause the web of material to wrap around the battery plate by gripping the wrapped edge of the plate and effectively locking the wrapping material in position against the enclosed battery plate as the remainder of the operation proceeds and particularly while the overlapping edges of the web material are sealed together.

Other objects and advantages of this invention will become apparent to those skilled in the art from the following detailed description, taken in conjunction with the annexed sheets of drawings.

DESCRIPTION OF A PREFERRED EMBODIMENT OF THE INVENTION

Figure 1:
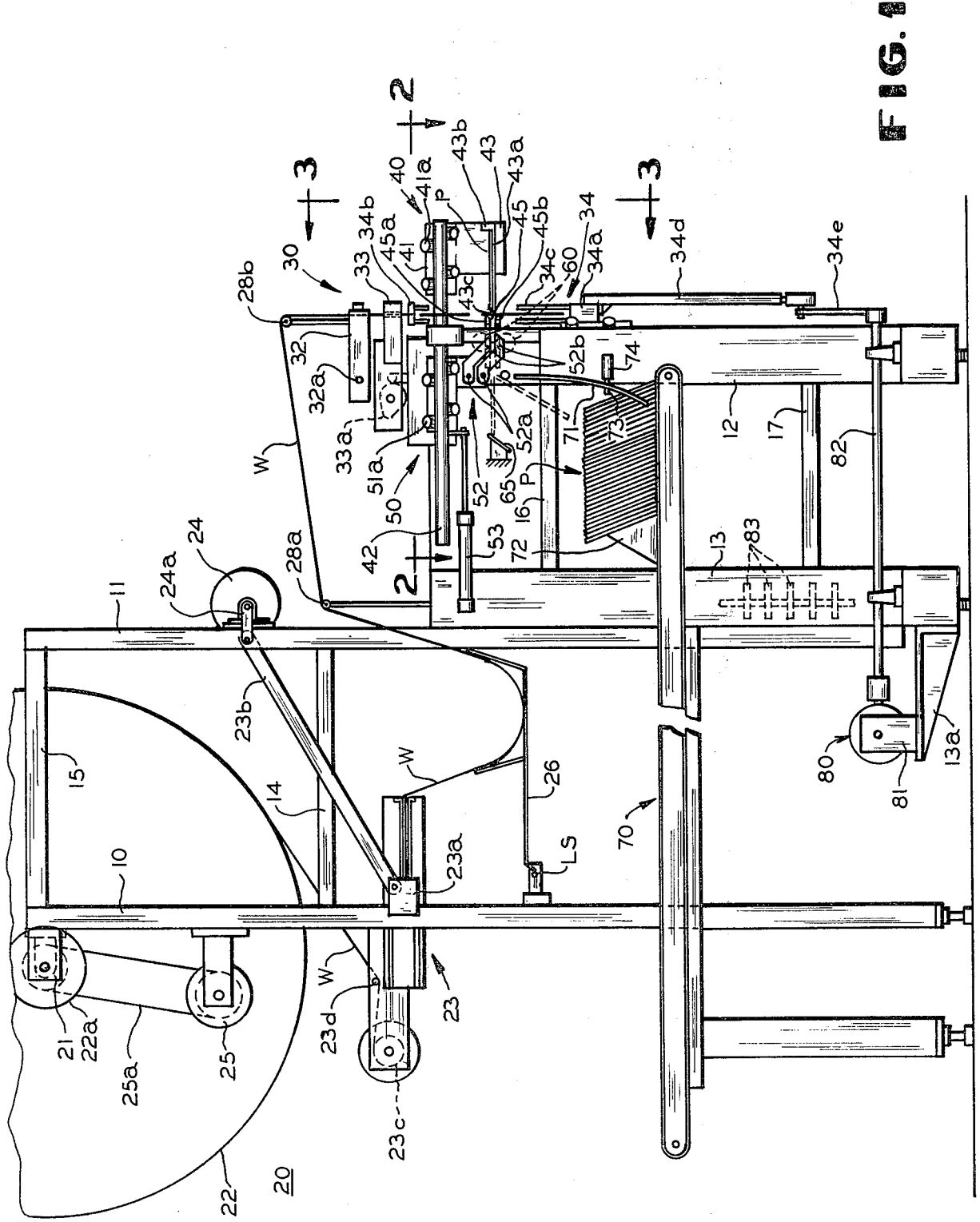
FIG. 1 is a front elevational schematic view of a battery plate wrapping machine incorporating the improvements of this invention.

As schematically illustrated in the drawings, a machine 1 embodying the improvements of this invention comprises seven distinct mechanisms which are appropriately mounted on an articulated frame constructed by welding together of appropriate structural members; for example, there are two parallel upright angles 10, two upright angles 11, a pair of upright channels 12 and a pair of upright channels 13. At least one of each of the aforementioned frame elements are shown in the drawings. Horizontal members 14, 15, 16 and 17 connect the aforementioned upright frame elements to make a unitary structure. The frame structure of the machine forms no part of the instant invention and thus will not be described in any further detail.

On the aforementioned frame structure there are mounted the following mechanisms:

1. A web supply mechanism 20, including a roll stand 21 for receiving a roll 22 of plastic sheeting or web W from which the pouches enclosing the battery plates are formed.
2. A web feeding and cutoff mechanism 30 including two web end conveying mechanisms 32 and 34 and a cutoff knife 33 which operate to repeatedly sever pre-determined lengths of web approximately twice the height of the battery plate to be wrapped.

3. A battery plate feeding mechanism 40 which pushes the leading edge of a battery plate tray adapted to receive plate P into engagement with the central portion of that segment of web W which is to form the pouch for that particular plate transverse of the length of the segment and then pushes the leading edge of the battery plate tray with the battery plate thereon and the adjacent web into a slot 45 also transverse of the length of its segment to effect the folding of the web about the battery plate.

4. A wrapped plate grasping mechanism 50 which engages the bottom edge of the battery plate P with the plastic web folded there around and pulls the assemblage through the web folding slot 45 while maintaining the alignment of the longitudinal sides of the web with respect to the lateral sides of the battery plate P.

5. A sealing mechanism 60 which simulataneously operates on both of the overlying lateral edges of the web immediately after they pass through the web folding slot and while the web is still held firmly in position relative to the battery plate by the grasping mechanism 50.

6. A wrapped plate conveyor 70 onto which the pouch enclosed battery plates P are successively dropped with the bottom end of the plate resting on the conveyor and the plate being disposed in slightly vertically inclined position; the conveyor 70 intermittently moves a distance equal to the thickness of each wrapped battery plate so as to move the battery plates P out of the machine in a horizontally extending stack of plates disposed at a slight vertical angle, and 7. A prime mover 80 for the machine which, through appropriate gearing, belt and chain drives, either operates the various mechanisms heretofore described or through a series of cams 83 driven by the prime mover controls the various hydraulic cylinders to effect all of the operations in the desired sequence and thus accomplish the successive wrapping of battery plates placed on the plate feeder 40 within a pouch of thermoplastic material supplied from the roll 22.

PLASTIC WEB SUPPLY MECHANISM

Adjacent the top of the vertical frame members 10, there is provided a roll stand 21 for mounting the hub 22a of a continuous roll 22 of thermoplastic sheet material. Successive lengths of plastic material web W are pulled off the roll 22 by a conventional reciprocating web pulling mechanism 23 which is mounted on the medial portion of the vertical frame members 10 and comprises a reciprocating clamp 23a which is driven by a lever connection 23b to a crank 24a rotated by a motor 24. This reciprocating feed mechanism is entirely conventional and is of the type that clamps the plastic web W during its motion toward the right, as viewed in FIG. 1, and then exerts no force on the web as it is reciprocated back to its extreme left hand position as shown in FIG. 1. Intermediate guide rollers 23c and 23d permit the web W to be withdrawn from the roll 22 in tangential fashion. To prevent the inertia of the relatively massive roll 22 from discharging an excessive amount of web material, an electrically controlled friction brake 25 is provided which is connected by a belt 25a and suitable pulleys to the hub 22a of the roll 22 and prevents the roll from turning except when a pulling force is applied to the web W by the feeding mechanism 23.

That portion of the web W which is pulled through the feeding mechanism 23 collects in the form of a depending loop and when the bottom of the loop engages a trough-shaped pivoted element 26, this element actuates a limit switch LS to stop the motor 24 driving the crank 24a. Thus, at all times, a loop of the web material W is always available for freely feeding into the machine 1.

Web material W then passes over guide rollers 28a and 28b and enters the machine by a vertically downwardly movement into the web feeding and cutoff mechanism 30.

WEB FEEDING AND CUTOFF MECHANISM

This mechanism comprises a first web feeder 32 of the reciprocating type, oscillating about a shaft 32a and incorporating appropriate conventional drive and web clamping mechanisms so that when the feeding mechanism 32 moves downwardly, the web is engaged and moved a short distance downwardly and into the shear mechanism 33. Again the details of shear mechanism 33 are entirely conventional and it is actuated in any suitable manner, such as by an eccentric 33a, to effect a severing of the web in timed relationship to other movements of other elements of the machine. The timing of the actuation of the web feeding mechanism 32 and the web shearing mechanism 33 will be hereinafter described in more detail.

Let us assume, however, that the shearing mechanism 33 has effected a cutting of the web W and at this point, the upper cut edge of the web is hidden within the shearing mechanism 33 and hence not conveniently available for engagement by a second web feeding mechanism 34 which comprises a block like member 34a slidably mounted for vertical movements on the lower portion of the vertical frame elements 12. The first web feeding mechanism 32 is actuated at this point to produce a short downwardly displacement of the cut edge of the web W below the shear mechanism 33 and in position to be engaged by a pair of laterally spaced web grippers 34b which project upwardly on rods 34c from slide block 34a. The slide block 34a, hence grippers 34b, are vertically reciprocated through a substantial stroke, in fact, a stroke equal to approximately twice the height of the battery plate to be wrapped, by a crank 34e and connecting arm 34d. Crank 34e is in turn driven from a main drive shaft 82 which is actuated by prime mover 80 through a gear reducing mechanism 81 appropriately mounted on a bracket 13a attached to the bottom end of the vertical frame elements 13. Grippers 34b are of conventional eccentric construction and are oscillated by their support rods 34c between a clamping position relative to an interposed web edge or a released position. A hydraulic cylinder (not shown) controlled in its operating sequence by a cam 83 effects such oscillation. Thus successive lengths of the plastic web W may be pulled downwardly from the shear mechanism 33 and positioned intermediate the battery plate loading mechanism 40 and a web folding transverse slot 45 defined between facing edges of horizontal plate members 45a and 45b appropriately mounted on the vertical frame elements 12.

The web W is severed to form the sheet to be folded around battery plate P to form the pouch or envelope containing the plate when the second web feeding mechanism 34 has drawn a web segment of the desired length beyond the cut-off location. This cut-off actuation is synchronized through mechanical linkages (not shown) from the common drive motor 80. At the end of the downstroke of rods 34c grippers 34b are released. The web segment or sheet is held essentially centered longitudinally on the transverse slot 45 defined by plates 45a and 45b by means of a spring biased pressure roller (not shown) bearing against the sheet and retaining it against a guide surface (not shown) above the plate 45a and in the vertical planar path of the sheet beneath the cut-off or shear 33. In this state the sheet is conditioned for prefolding by the advance of the leading edge 43c of the plate tray 43a.

After the sheet has begun to enter the slot 45 under the impetus of the plate tray 43a and has been drawn from between the pressure roller and guide surface, the first feeding mechanism 32 is oscillated by rotation of a cam (not shown) which can be on the shaft supporting the shear drive cam 33a, to advance a suitable length of the web W from beneath shear mechanism 33 to a suitable length for gripping by the grippers 34b. When the sheet and battery plate have been fully drawn into the slot 45 and the plate tray 43a has been retracted, the elevated and web engaged grippers 34b are moved downward. Elevation of grippers 34b can be accomplished while the sheet folding and plate advance functions of plate tray 43a occur, since the grippers 34b and their supporting rods 34c are outboard of the lateral sides of the sheet and clear of the path of travel of the plate P and tray 43a. The critical timing and sequencing of these elements in the above sequence is related to the motor drive 80 either through the control of cams 83 or by direct mechanical linkages by means not shown.

BATTERY PLATE FEEDING MECHANISM

Figure 2:
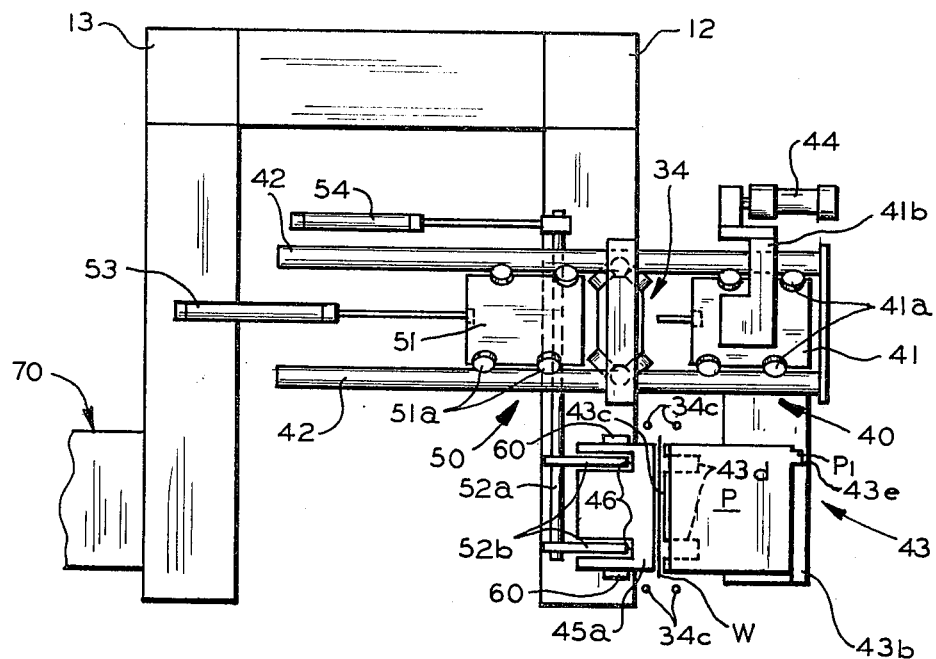
FIG. 2 is a plan view of a portion of FIG. 1, taken along the line 2—2 of FIG. 1.
Figure 3:
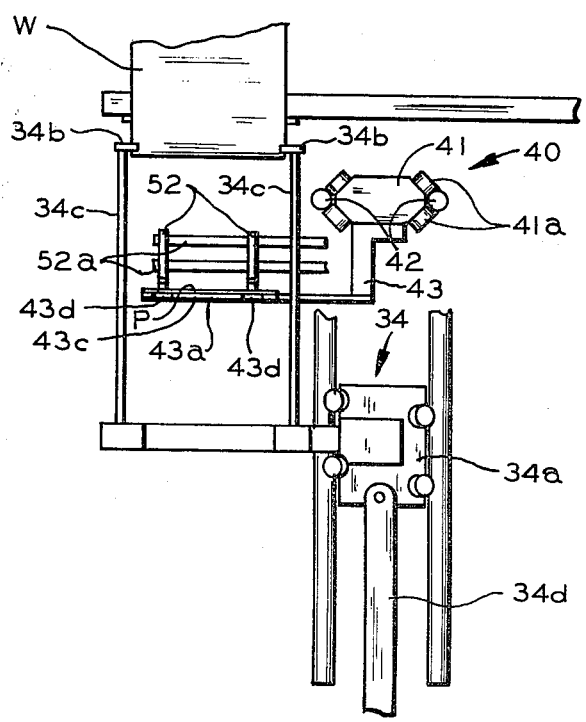
FIG. 3 is a end elevational view of a portion of FIG. 1, taken along line 3—3 of FIG. 1.

Referring first to FIG. 2, the battery plate feeding mechanism 40 comprises a carriage 41 which reciprocates horizontally on a pair of cylindrical guide rails 42 which extend transversely across the machine a substantial distance and are suitable supported by the various vertical frame elements of the machine. The carriage 41 has a generally hexagonally shaped vertical cross section and a plurality of rollers 41a are mounted on each of the hexagonal surfaces that are disposed at a forty-five degree angle relative to the vertical. These rollers co-operate with the top and bottom portions of the adjacent guide rails 42 and thus permit free horizontal reciprocal motion of the carriage 41 without inducing any binds or misalignment in the direction of such motion.

A battery plate feeding frame 43 is secured by suitable bolts in depending relationship to the carriage 41. Frame 43 extends forwardly from carriage 41 and defines a horizontal battery plate supporting tray 43a in alignment with vertical path of plastic web W. Preferably tray 43a is slightly longer than a battery plate P so that the leading edge 43c of the tray will extend beyond the plate P when the top end of the plate P engages an integral shoulder 43b formed on the right end of tray 43a as viewed in FIGS. 1 and 2. Shoulder 43b is arranged with an end abuttment 43e against which the side of plate lug P1 is abutted. Leading edge 43c presents a true, square, fold defining edge to the web while accommodating any irregularities at the bottom edge of the plate P and causes the supported battery plate to move integrally with the supporting tray as it is moved toward the web folding aperture 45. Edge 43c has cutouts 43d to permit the grasping of the plate P and enveloping sheet portions of web W by tong ends 52b without also grasping tray 43a and thus without interfering with the withdrawal of tray 43a while the tong ends retain the sheet-plate relationship.

The reciprocating motions of the plate feed carriage 41 are produced by a small cylinder 44 which is mounted behind the carriage 41 and engages an appropriate extension 41b on such carriage to produce the desired reciprocal movement of the carriage. Such movement is of course limited to bringing the leading edge 43c of the tray into engagement with the plastic web and pushing the web and the supported plate into the aperture 45 a distance sufficient for the plate grasping mechanism 50, that is disposed on the other side of the aperture 45, to grasp the web enfolded leading edge of the battery plate P. The operation of the plate grasping mechanism will be hereafter described but for the moment, it should be understood that the supported battery plate P and the web W are under positive control prior to and after the plate grasping mechanism engages the web enfolded leading edge P1 of the battery plate through cut outs 43d in plate tray 43a. At this point, the hydraulic cylinder 44 is reversely actuated to withdraw the support tray 43a from beneath the battery plate and to provide vertical clearance for the downward movement of the next segment of the plastic web W.

BATTERY PLATE GRASPING MECHANISM

The battery plate grasping mechanism 50 also utilizes a hexagonally shaped carriage 51 on which are mounted a plurality of rollers 51a which cooperate with the left hand ends of the guide bars 42 as a traversing means for the grippers in a manner similar to that described in connection with the operation of the battery plate feeding carriage.

A pair of battery plate gripping elements 52 (FIG. 2) are respectively mounted in spaced relationship on a pair of forward projecting supporting rods 52a which traverse with carriage 51. Rods 52a are oscillatable relative to each other to cause the grasping units 52 to move to an open position, wherein the spacing between their tong-shaped ends 52b is greater than that of the web enfolding leading edge of the battery plate, to a clamping position wherein they exert a firm grip on the web enfolded leading edge of the battery plate P. As is clearly shown in FIG. 1, the grasping tongs 52b assume their clamping position after the web enfolded leading edge P1 of the battery plate passes through the aperture defining edges of plates 45a and 45b of the web folding slot 45. Where the plates 45a and 45b extend beyond the position to which tongs 52b are advancing they are cut out at 46 to pass the tongs. Shortly after the actuation of the grasping units 52 to their clamping position, wherein the tong ends 52b register with tray cutouts 43d and the plate cutouts 46, plate feed carriage 41 and support tray 43a are retracted to withdraw tray 43a from the enveloping web without disturbing the web-plate relationship.

The carriage 51, and hence the plate grippers 52 are reciprocated along the slide rods 42 by a hydraulic cylinder 53 which is disposed between the two guide rods 42 and has its operating rod directly connected to the end of the carriage 51. The clamping action of the grippers 52 is controlled by a cylinder 54, which is appropriately mounted by means not shown in the drawings to move with the carriage 51, and is operably connected to each of the tong actuating rods 52a to oscillate said rods to effect the clamping and unclamping action of the tongs 52b. Actuation of the cylinder for rods 52a as is the case with all other cylinders, is sequenced and timed by cams 83 driven by motor 80.

It is thus apparent that the plate grasping mechanism 50 is effective to receive the web enfolded leading edge of the battery plate and pull the plate and the surrounding plastic web entirely through the folding aperture 45. While this action is occurring the overlying lateral edges of the web are sealed together by an appropriate heat sealing mechanism.

HEAT SEALING MECHANISM

It should be understood that any of a number of well known forms of heat sealing mechanisms can be employed in the battery plate wrapping machine incorporating the improvements of this invention. There is shown in the drawing a simple form of heat sealing mechanism comprising a pair of opposed electrically heated rollers which engage the lateral edges of the plastic web at an outboard position relative to the enclosed battery plate and effect the sealing of the overlying edges primarily through the application of heat and a very modest pressure. If desired, the heat seal could be effected by ultrasonic anvils or a pair of laser beam generators, each positioned on the machine to direct their energy into the overlying edges at a position outboard of the enclosed battery plate.

WRAPPED PLATE CONVEYOR MECHANISM

As the plate grasping cylinder 53 reaches the end of its stroke the top or trailing end of the plate and the surrounding plastic will be clearing the heat sealing rollers 60. At this point, the leading edge of the web enclosed battery plate strikes a fixed deflecting abutment 64 appropriately positioned on the articulated frame of the machine 11 to deflect the leading edge, namely the bottom edge of the plastic enclosed battery plate downwardly so that the plate falls onto a horizontal conveyor 70 and strikes the conveyor surface with the bottom edge of the plate. To assist in this motion, vertically disposed but arcuately inclined guide members 71 are provided which steer the top end of the web enclosed battery plate during its fall onto the conveyor 70.

A plate tipping plunger 73 operated by a cylinder 74 is provided in a region clear of guide means 71. When the plastic enclosed battery plate strikes the top of the conveyor 70, plunger cylinder 74 is actuated to cause plunger 73 to move to the left and impart a horizontal blow to the freshly dropped battery plate, causing the top of the plate to move to the left and assume its position in an inclined stack against an inclined support wall 72 carried by the top of conveyor 70.

The driving mechanism (not shown) for conveyor 70 is arranged to move the conveyor intermittently a distance equivalent to the thickness of one wrapped battery plate so that each such wrapped plate is successively deposited on the top of the conveyor and moved into the vertically inclined stack, the entire stack is moved to the left to the discharge end of the machine a distance sufficient to permit the next wrapped plate to be dropped onto the top of the conveyor 70. Obviously, the positioning of the wrapped plates in this fashion greatly expedites the next operation in the manufacture of batteries wherein an appropriate number of the wrapped plates are handled as a unit and inserted as a stack in a battery case.

PRIME MOVER AND TIMING MECHANISM

The function of the prime mover 80 in driving the main control shaft 82 and web feed 34 has already been described. Additionally, through appropriate shaft and gearing, belt or chain drives, the prime mover 80 is utilized to operate the web cutoff mechanism 33 and the web feed 32. More importantly, prime mover 80 is mechanically connected to a vertical stack of cams 83 which in turn operate appropriate valves to control the operation of all of the hydraulic cylinders employed in the described machine. The drive sequencing for plate tipping plunger 73 and the plate conveyor 70 are also derived from main drive 80 either through cams 83 or mechanical actuating links. Hence the timing of the machine is automatically accomplished since all operation sequences can be based upon the operation of the web feeding mechanism 30.

If the machine is automatically supplied with battery plates to be wrapped, then it is necessary to provide an interconnecting control to initiate the required sequence of operation upon the deposit of a new battery plate on the plate conveyor mechanism 40. If, on the other hand, the machine is to be manually operated, the operator's station is located adjacent to the battery support tray 43a and the controls for the machine are similarly located so that the operator manually actuates a plate wrap cycle as soon as he has placed a fresh battery plate on the tray 41b of the battery plate conveying mechanism 40. The machine will then proceed through its cycle and condition itself for the next wrap cycle.

From the foregoing description it is apparent that the improvements provided by this invention to existing battery plate wrapping machines will insure a more accurate wrapping of the material around each battery plate. Additionally, the wrapped battery plates are discharged from the machine in a horizontally extending stack of vertically inclined wrapped plates with each plate being disposed in the proper position so that a group of such plates may be handled as a unit for insertion into a battery case. The length of the plastic wrapping does not vary from one plate to the other, and the alignment of the wrapping relative to each battery plate is far more precise, thereby insuring that the overlying lateral edges of the wrap are completely sealed together and that the plate is provided with a completely sealed enclosing pouch.

The disclosed apparatus prefolds sheet material for enveloping battery plates along a precisely defined line without regard to plate irregularities by first engaging the sheet with a precisely defined edge 43c in advance of the plate and moving with the plate. The leading edge 43c of tray 43a cooperates with the precisely defined edges of the plates 45a and 45b defining the transverse slot 45 to insure a fold square to the longitudinal margins of the sheet and thus, overlapped with each other. During the travel of the sandwich made up of sheet-plate-sheet layers to and through the overlying sheet edge bonder the sheet-plate-sheet relationship is positively maintained by the clamping of tongs 52b on the opposed outer faces of the enclosing sheets. No forces are applied to the plate P which might shift it with respect to its position established by the relationship of the tray 43a and plates 45a and 45b and their relative motion. The clamping tongs 52b engage and fix the positional relationships of the sandwich while those relationships are maintained under control of the tray 43a and only after the tongs are engaged is the tray 43a withdrawn. Thus positive control of the assembled elements is maintained throughout the assembly.

In recapitulation of the invention, it comprises a machine having a fixture for supporting individual battery plates and adapted for movement between a first battery plate loading position and a second wrapper folding position, the battery plate tray 43a with its traversing carriage 41. The fixture includes an abutment 43b and 43e against which the top of the plates and their lugs respectively are abutted to orient the bottom of the plate slightly behind (advantageously about 1/16 inch) the leading edge 43c of the tray. It also has means for positioning individual sheets adapted to be wrapped around individual plates in a sheet station normal to the movement of the plate by the fixture, with their longitudinal center aligned generally with and intersected by the path of movement of the fixture and proximate to the fixture and a side, the bottom, of a fixture supported plate, the web feed mechanisms 32 and 34. A pair of spaced members, plates 45a and 45b, define an aperture, slot 45 in registry with the path of movement of the fixture which is adapted to receive the leading edge of the fixture supported plate, the plate bottom, and are located on the side of the sheet positioning means opposite the first position of the fixture. A fixture supported plate enfolded in a sheet, when advanced toward its second position, is exposed on the side of the spaced members, plates 45a and 45b, remote from the sheet positioning means, the sheet station. Gripper means, tongs 52b, adapted to grip the leading edge of a fixture supported plate and a plate enfolding sheet, the bottom of the plate P, on the side of the spaced members opposite the sheet positioning means have traversing means, carriage 51, to carry the enfolded plate along a path between a third position, the position of exposure of the enfolded plate from plates 45a and 45b, to a fourth position, a position free of plates 45a and 45b. As the enfolded plate is carried along the path, from the third to the fourth position it is passed through a bonding station, heated rollers 60, along the side of the path which is adapted to bond together the overlapping edge of the plate enveloping sheet portions.

In practice it has been advantageous to provide drive means for the fixture 43a, the cylinder 44, and for the gripper traversing means, the cylinder 53, and to move the battery plate mounting fixture in planes parallel to the plane of the major surface of supporting plates. Also the leading edge of the fixture, edge 43c, and of the plate, the plate bottom, are normal to the plane of the sheet material in the sheet station so that movement normal to the sheet makes a square fold transverse of the sheet in its longitudinal center to insure that these portions of the sheet extending beyond the width of the battery plate overlay each other for bonding to each other. Typically the sheet is about one-half inch wider than the plate so that one-quarter inch of overlay is available for bonding along its longitudinal edge.

Pared gripper tongs 52b have been shown with registering cutouts 43d in plate tray 43a and 46 in slot defining plates 45a and 45b. However, it is to be appreciated that a single cutout extending across the elements between the tong clearances could be provided to produce a C shaped planar form instead of the E shaped form. Other drive paths such as with the plate held in a vertical rather than a horizontal plane and the web feed in a horizontal rather than a vertical path might be employed. Further, oscillating motions of the plate tray might be employed in place of the rectalinear motion. Accordingly, modifications of this invention will be apparent to those skilled in the art and it is intended that the preceeding description be read as illustrative of the invention and not in a limiting sense.

What is claimed is:

1. A machine for wrapping electrical storage battery plates comprising a fixture for supporting individual battery plates and moveable between a first plate loading position and a second wrapper folding position; means for positioning individual sheets adapted to be wrapped around individual plates in a sheet station with their longitudinal center aligned generally with and intersected by the path of movement of said fixture and proximate to said fixture and a side of a fixture supported plate; a pair of spaced members defining an aperture in registry with the path of movement of said fixture and of a width to receive the sheet and leading edge of a fixture supported plate and to constrain said sheet against said fixture and plate, said members being located on the side of said sheet positioning means opposite said first position of said fixture, said fixture movement displacing a portion of a fixture supported plate enfolded in a sheet beyond the side of said spaced members remote from said sheet positioning means when said fixture is in said second wrapper folding position; gripper means for gripping the leading edge of a fixture supported plate and a plate enfolding sheet on the side of said spaced members opposite said sheet positioning means; means for actuating said gripper means to grip said plate and enfolding sheet while said fixture supports said plate; traversing means for said gripper means to carry said gripper means and a sheet enfolded plate gripped thereby along a path between a third position in said aperture between said spaced members and a fourth position freeing said sheet enfolded plate from said spaced members; and bonding means located along said path for bonding together the overlapping edge of the plate enfolding sheet portions.

2. A machine according to claim 1 including drive means for said fixture for driving said fixture between said first plate loading position and said second plate wrapper folding position.

3. A machine according to claim 1 including drive means for said gripper traversing means for driving said traversing means between said third and fourth positions.

4. A machine according to claim 1 wherein the fixture for supporting individual battery plates is moveable in a plane parallel to the planes of the major surfaces of the plates mounted thereon.

5. A machine according to claim 1 wherein the fixture includes means for positioning the side of a battery plate opposite the side having a cell connecting lug protruding therefrom adjacent the mans for positioning individual sheets; and wherein said bonding station includes means on opposite sides of the battery plate path to bond the overlapping edges of the plate enveloping sheet portions on opposite sides of the plate.

6. A machine according to claim 1 wherein said pair of spaced members include at least one member having a portion extending beyond the limit of the gripper means traverse to said third position and having an aperture which registers with said gripper means whereby said gripper means grips said plate and a plate enfolding sheet without gripping said member.

7. A machine for wrapping electrical storage battery plates comprising a fixture for supporting individual battery plates and movable between a first plate loading position and a second wrapper folding position; means for positioning individual sheets adapted to be wrapped around individual plates in a sheet station with their longitudinal center aligned generally with and intersected by the path of movement of said fixture and proximate to said fixture and a side of a fixture supported plate; a pair of spaced members defining an aperture in registry with the path of movement of said fixture and of a width to receive the sheet and leading edge of the fixture and a fixture supported plate, and to constrain said sheet against said fixture and plate, said fixture having a leading edge spaced ahead of the leading edge of a supported plate, whereby the advance of said fixture to intersect a sheet and enter said aperture prefolds the sheet around the plate, said fixture movement displacing the leading portions of a fixture supported plate enfolded in a sheet beyond said spaced members when said fixture is in said second wrapper folding position; gripper means for gripping the leading edge of a fixture supported plate and a plate enfolding sheet after emergence thereof from said spaced members; means for actuating said gripper means to grip said plate and enfolding sheet; traversing means for said gripper means to carry said gripper means and a sheet enfolded plate gripped thereby along a path freeing said sheet enfolded plate from said fixture and said spaced members; and bonding means located along said path for bonding together the overlapping edges of the plate enfolding sheet portions.

8. A machine according to claim 7 wherein said fixture has an aperture in its leading edge which registers with said gripper means whereby said gripper means grips said plate and a plate enfolding sheet without gripping said fixture.

9. A machine according to claim 7 wherein said gripper means includes a plurality of spaced opposed gripper tongs engagable with spaced portions of a plate and a plate enfolding sheet and wherein said fixture has a plurality of spaced apertures in its leading edge which register with said spaced opposed gripper tongs whereby said gripper tongs engage said plate and a plate enfolding sheet without gripping said fixture.

10. A machine for enclosing a battery plate within a pouch of material, said machine having a plate carrier mounted for reciprocating horizontal movements and constructed and arranged to receive a battery plate horizontally thereon; means defining a slot aligned with the horizontal path of movement of said carrier whereby the edge of said plate leading its advance toward said slot by said carrier enters said slot; means for intermittently positioning a sheet of said material in a vertical position between said slot and said plate carrier, the positioned sheet being approximately twice the height of the battery plate and the center of said sheet being aligned with said slot; means for moving said plate carrier along said path of horizontal movement whereby the horizontal movement of said plate carrier and battery plate forces said center sheet portion into and through said slot to initiate the folding of said sheet around said battery plate; a plate gripper carriage mounted for reciprocating horizontal movements on the opposite side of said means defining said slot from said plate carrier; gripper means on said carriage for grasping the sheet enfolded leading edge of the battery plate as it passes through said slot and for holding said sheet in firm engagement with the enfolded plate during the entire horizontal movement of said gripper carriage away from said slot until the enfolded plate clears said means defining said slot; means for actuating said gripper means to grasp said plate and enfolding sheet while said plate carrier supports said plate; and laterally spaced bonding means for bonding the opposed overlying lateral edges of said sheet during the movement of said edges away from said means defining said slot to complete a pouch for the web enclosed battery plate.

11. A machine for enclosing a battery plate within a pouch of material, said machine having a plate carrier mounted for reciprocating horizontal movements and constructed and arranged to receive a battery plate horizontally thereon; means defining a slot aligned with the horizontal path of movement of said carrier whereby the edge of said plate leading its advance toward said slot by said carrier enters said slot; means for intermittently positioning a sheet of said material in a vertical position betwen said slot and said plate carrier, the positioned sheet being approximately twice the height of the battery plate and the center of said sheet being aligned with said slot; means for moving said plate carrier along said path of horizontal movement whereby the horizontal movement of said plate carrier and battery plate forces said center sheet portion into and through said slot to initiate the folding of said sheet around said battery plate; a plate gripper carriage mounted for reciprocating horizontal movements on the opposite side of said means defining said slot from said plate carrier; gripper means on said carriage for grasping the sheet enfolded leading edge of the battery plate as it passes through said slot and for holding said sheet in firm engagement with the enfolded plate during the entire horizontal movement of said gripper carriage away from said slot until the enfolded plate clears said means defining said slot; means for actuating said gripper means to grasp said plate and enfolding sheet while said plate carrier supports said plate; and laterally spaced bonding means for bonding the opposed overlying lateral edges of said sheet during the movement of said edges away from said means defining said slot to complete a pouch for the web enclosed battery plate, a horizontally movable wrapped plate conveyor disposed beneath said plate gripper means; and a fixed deflector plate disposed in the path of movement of said sheet enclosed bottom edge of the battery plate to engage said edge concurrently with the release of said gripper means to deflect said bottom edge of the sheet enclosed plate downwardly to fall onto said conveyor with the wrapped plate in a substantially upright position.

12. A machine in accordance with claim 11 including means for intermittently feeding a length of web from a continuous roll supply thereof comprising shear mechanism for successively severing the desired lengths of said web from the supply to form the sheet, a first vertically reciprocating web feeding mechanism positioned above said shear mechanism and being movable through a short stroke to advance the cut edge of the web downwardly below said shear mechanism; a second web feeding mechanism positioned below said shear mechanism and having a stroke approximately equal to the desired length of sheet required to enclose the battery plate, said second web feeding mechanism being movable upwardly to engage the cut end of the web and pull same downwardly after said plate carrier has moved away from said means defining said slot, and timing means controlling the operation of said plate carrier, said gripper means, said shear mechanism and said two web feeding mechanisms to operate same in the following sequence:
1. the first web feeding mechanism moves the web end below the shear mechanism;
2. the second web feeding mechanism rises to engage the web end and pull same downwardly past said slot;
3. the shear mechanism is operated and the second web feeding mechanism releases the bottom edge of the web;
4. the plate carrier moves toward said slot and carries the plate bottom edge into said slot, folding the web there around;
5. the plate grippers are operated to grip the sheet enfolded bottom of the plate, and;
6. the plate carriage retracts while the bonding operation is performed and the wrapped plate is deposited on a conveyor.

13. A machine in accordance with claim 11 including a reciprocating plunger means mounted in a fixed position on the machine adjacent the wrapped plate supporting position on said conveyor, and means for intermittently actuating said plunger to push each fallen plate into a stack with preceding wrapped plates on said conveyor.

14. A machine in accordance with claim 11 including means for intermittently moving said wrapped plate conveyor away from the point of dropping of the wrapped plate thereon; a vertically inclined plate stacking support mounted on said conveyor; reciprocating plunger means mounted in a fixed position on the machine adjacent the said dropping point of the wrapped plates onto said conveyor, said means for intermittently actuating said plunger to push each dropped wrapped plate toward said stacking support, thereby producing a vertically inclined, horizontally extending stack of wrapped plates on said conveyor.

15. The machine in accordance with claim 12 including means for intermittently moving said wrapped plates conveyor away from the point of dropping of the wrapped plate thereon; a vertically inclined plate stacking support mounted on said conveyor; a reciprocating plunger mounted in a fixed position on the machine adjacent the dropping point of the wrapped plates onto said conveyor; means for actuating said plunger between a position free of the dropped plates to a position bearing against said dropped plates to tip them toward said plate stacking support; wherein said timing means controls the operation of said wrapped plate conveyor and said plunger means in said sequence to:
7. actuate the plunger means to tip the dropped plate toward said plate stacking support; and
8. advance the wrapped plate conveyor the thickness of a wrapped plate.

16. An apparatus for forming lead-acid storage battery plate envelopes from a continuous roll of sealable separator material, said apparatus comprising: material feed means for supplying a web of material from said roll for use in said envelopes; shear mechanism for successively severing the desired lengths of said web from the supply to form the sheet, draw means for intermittently drawing preselected lengths of separator material into a processing position, said draw means including a first vertically reciprocating web feeding mechanism positioned above said shear mechanism and being movable through a short stroke to advance the cut edge of the web downwardly below said shear mechanism; a second web feeding mechanism positioned below said shear mechanism and having a stroke approximately equal to the desired length of sheet required to enclose the battery plate, said second web feeding mechanism being movable upwardly to engage the cut end of the web and pull same downwardly; shuttle means for folding said envelope forming lengths at said processing position to overlap at least two portions of said separator material to be joined, means for sealing said overlapping portions together to form said battery plate envelope, and timing means controlling the operation of said shear mechanism, said two web feeding mechanisms, and said shuttle means to operate same in the following repetitive sequence:
(1) the first web feeding mechanism moves the web end below the shear mechanism;
(2) the second web feeding mechanism rises to engage the web end and pull same downwardly to said processing position,
(3) the shear mechanism is operated and the second web feeding mechanism releases the bottom edge of the web;
(4) said shuttle means moves to fold said web into envelope configuration,
(5) said shuttle means retracts while the sealing operation is performed.

* * * * *